UNITED STATES PATENT OFFICE.

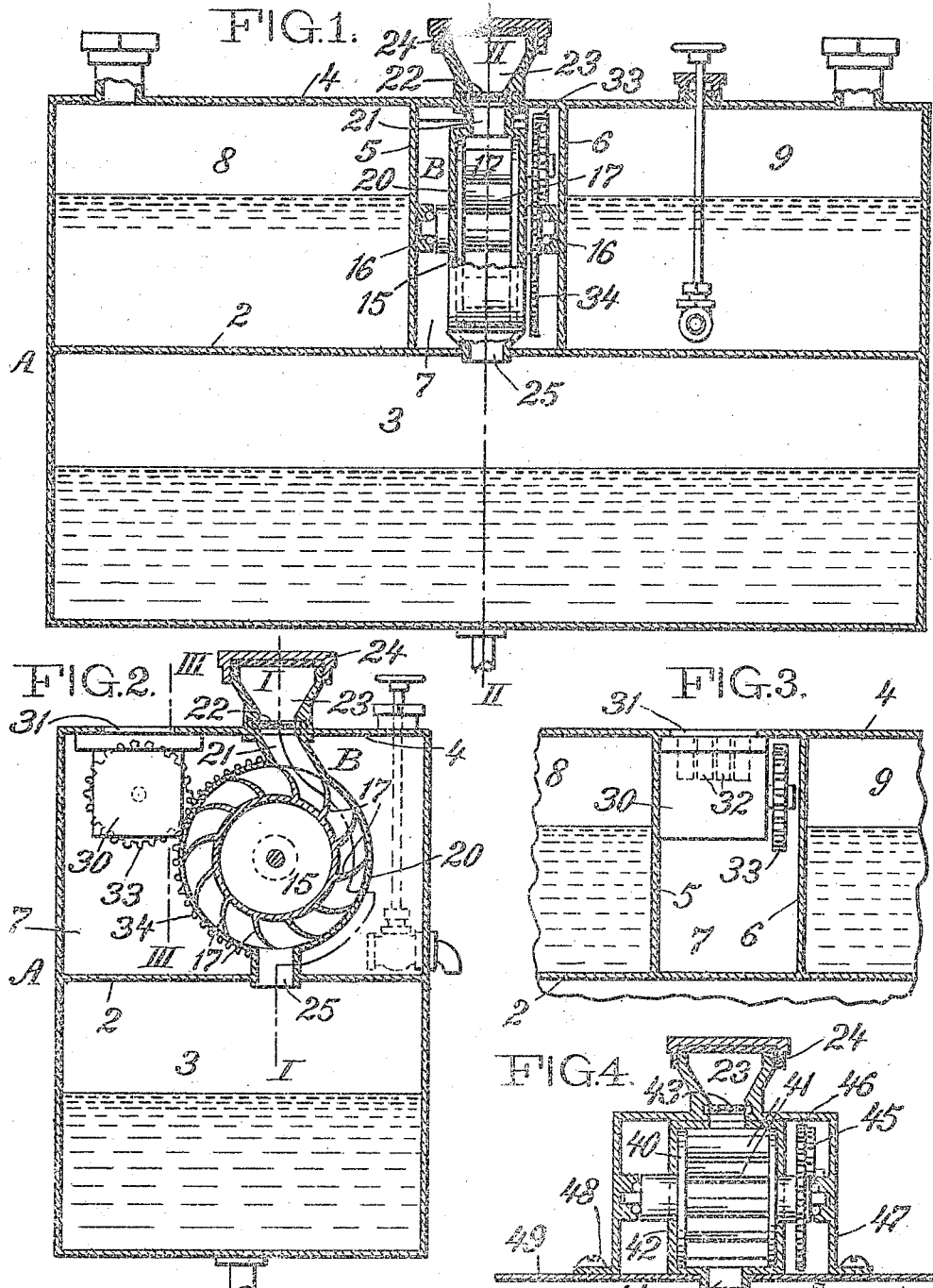

STEPHEN TACTKIAN, OF NEW YORK, N. Y.

MEASURING DEVICE FOR FLUID-TANKS.

1,269,020.

Specification of Letters Patent.  Patented June 11, 1918.

Application filed June 21, 1916.  Serial No. 104,882.

*To all whom it may concern:*

Be it known that I, STEPHEN TACTKIAN, a subject of the Kingdom of Great Britain, residing at New York, in the county and State of New York, have invented certain new and useful Improvements in Measuring Devices for Fluid-Tanks, of which the following is a specification.

This invention comprises more particularly a means for measuring the amount of liquid discharged into a tank or receptacle by the flow of the liquid into the receptacle.

The invention has for an object the provision of a device of this nature of simple construction and few operating parts, and one which may be easily combined with or embodied in a desired tank or receptacle, such for instance as the gasolene tank of an automobile.

For further comprehension of the invention, and of the objects and advantages thereof, reference will be had to the following description and accompanying drawings, and to the appended claim, in which the novel features of the invention are more particularly set forth.

In the accompanying drawings, to the precise form of which I do not limit myself—Figure 1 is a longitudinal sectional view of a liquid tank or receptacle, having my invention applied thereto; this view being taken on the line I—I of Fig. 2. Fig. 2 is a transverse section on the line II—II of Fig. 1. Fig. 3 is a detail section on the line III—III of Fig. 2. Fig. 4 is a detail sectional view of a modification.

In Figs. 1 to 3 my invention is shown incorporated in a tank A, such as the fuel tank of an automobile, motor boat or the like. This tank as here shown, is divided into upper and lower sections by a horizontal partition 2, the lower section 3 forming the main receptacle for the motor fuel, generally gasolene. Extending between partition 2 and the roof 4 of the tank, are a pair of vertical walls or partitions 5 and 6, which divide the upper section into a central compartment 7, and side compartments 8 and 9 respectively. The central compartment 7 is adapted to have the fluid measuring device B mounted therein. The side compartments 8 and 9 may be used respectively to contain a lubricating fluid and an auxiliary supply of motor fuel.

In the present embodiment of the invention, the measuring device comprises a wheel 15 rotatably mounted in the bearings 16 on the walls 5 and 6. This wheel has on its periphery, a series of cups 17 disposed approximately tangentially to the wheel so as to open upward on one side of the wheel, and downward on the opposite side, as shown. This wheel is closely inclosed by a cylindrical housing 20, the upper side of which communicates by a tube or passage 21 with a screened opening 22 in the roof 4 of the tank, while a filling funnel 23, closed by a removable cap 24, may be provided above the opening 22. As shown in Fig. 2 the tube 21 communicates with the wheel 15 to that side of the vertical plane of the axis of the wheel on which the cups are upturned.

Extending downwardly from the bottom of the housing 20, is a tube 25, which passes through the horizontal partition 2, to provide a discharge passage from the wheel 15 to the receptacle 3.

Mounted in the compartment 7 adjacent to the wheel 15, is an indicating device 30, the details of which are not here illustrated, as such devices are well known, the roof 4 of the tank having an opening 31 therein, through which the indicators 32 may be seen. This indicating device may be operatively connected to the wheel by any suitable means, as the intermeshing gears 33 and 34 fixed respectively on the indicating device and wheel. While I have shown here a cupped wheel for measuring the flow of liquid, other means, such for instance as a displacement piston, may be provided and suitably connected to the indicator.

The operation of my improved fluid measuring device will be readily understood from the foregoing description. The liquid is poured in through the opening 22, and passes through the passage 21 to the cups 17 which are successively brought into juxtaposition beneath the mouth of the passage as the wheel revolves under the weight of the liquid. The liquid is discharged successively from the cups through the tube 25 into the receptacle 3, the measuring wheel, in effect, constituting a portion of the inlet passage to the receptacle. The capacity of the cups being known, the amount of liquid that flows into the receptacle 3 can be measured by the number of revolutions made by the wheel, the indicating device being arranged to indicate the volume of fluid, according to any standard cubic measure.

In the modification shown in Fig. 4, the device is shown in the form of a detachable attachment for a tank. The measuring device proper, is the same as above described, comprising a wheel 40, carrying cups 41, and which is inclosed by a housing 42 communicating at the top with a filling opening 43, and having at its bottom a discharge tube 44. Gears 45 and 46, similar to the gears 33 and 34, form the connection between the measuring wheel and the indicator. These parts are here shown mounted in a suitable casing 47, which may be secured by any suitable means as by the detachable screws 48, on a tank 49, the top only of which is shown in Fig. 4.

Having thus described my invention, I claim:

A tank subdivided by a horizontal partition and vertical partitions into a lower compartment and upper middle and end compartments, the middle compartment having an upper inlet and a lower outlet discharging into the lower compartment, a measuring wheel in the middle compartment and journaled in the side walls thereof, a housing inclosing the measuring wheel and in communication with the inlet and the outlet of the middle compartment, and indicating mechanism disposed in the middle compartment exterior to the housing of the measuring wheel and geared to the latter.

In testimony whereof, I affix my signature, in the presence of two witnesses.

STEPHEN TACTKIAN.

Witnesses:
HELEN E. KOELSCH,
HARRY TERHUNE.